(12) United States Patent
Nakazawa (10) Patent No.: US 9,700,982 B2
(45) Date of Patent: Jul. 11, 2017

(54) ROTARY JOINT SUPPORT STRUCTURE SPINDLE OF MACHINE TOOL, AND ELECTRIC MOTOR

(71) Applicant: FANUC CORPORATION, Yamanashi (JP)

(72) Inventor: Yasuyuki Nakazawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/966,033

(22) Filed: Dec. 11, 2015

(65) Prior Publication Data

US 2016/0167185 A1 Jun. 16, 2016

(30) Foreign Application Priority Data

Dec. 16, 2014 (JP) ................................. 2014-254437

(51) Int. Cl.
*F16L 39/04* (2006.01)
*B23Q 11/10* (2006.01)

(52) U.S. Cl.
CPC ............ *B23Q 11/103* (2013.01); *F16L 39/04* (2013.01)

(58) Field of Classification Search
CPC ... F16L 27/08; F16L 27/0804; F16L 27/0808; F16L 27/0816; B23Q 11/103
See application file for complete search history.

(56) References Cited

U.S. PATENT DOCUMENTS

| 5,072,948 A | 12/1991 | Kostrzewski |
| 5,538,292 A * | 7/1996 | Sommer ............. F16L 27/0808 |
| 2002/0159852 A1* | 10/2002 | Katsuzawa .......... B23Q 11/103 |
| 2015/0354549 A1* | 12/2015 | Rabhi ................. F16L 27/0808 |

FOREIGN PATENT DOCUMENTS

| EP | 0319662 A | 6/1989 |
| JP | 08019936 A | 1/1996 |
| JP | 2966799 B2 | 10/1999 |
| JP | 2002321138 A | 11/2002 |
| JP | 2005249008 A | 9/2005 |
| JP | 3806312 B2 | 8/2006 |
| JP | 2009202301 A | 9/2009 |

(Continued)

OTHER PUBLICATIONS

English Translation of Japanese Publication No. 2009228804, published Oct. 8, 2009, 17 pages.

(Continued)

*Primary Examiner* — David E Bochna
(74) *Attorney, Agent, or Firm* — Fredrikson & Byron, P.A.

(57) ABSTRACT

A rotary joint support structure includes a rotary joint holding part which covers contact parts between a rotating side member and a stationary side member, at least one drain hole which extends from the outside to the rotary joint holding part, a first cleaning passage which communicates with the rotary joint holding part, a hollow shaft holding part which covers the hollow shaft and hollow shaft surrounding part, at least one cutaway part which is formed so as to communicate the outside with the hollow shaft holding part, and a second cleaning passage which is formed inside the housing corresponding to the at least one cutaway part.

9 Claims, 8 Drawing Sheets

(56) References Cited

FOREIGN PATENT DOCUMENTS

JP       2009228804 A    10/2009

OTHER PUBLICATIONS

English Translation of Japanese Publication No. 2009202301, published Sep. 10, 2009, 8 pages.
English Translation of Japanese Publication No. 2005249008, published Sep. 15, 2005, 14 pages.
English Translation of Japanese Publication No. 2002321138, published Nov. 5, 2002, 9 pages.
English Translation of Japanese Publication No. 08019936, published Jan. 23, 1996, 8 pages.
English Translation of European Publication No. 0319662, published Jun. 14, 1989, 7 pages.
English Abstract and Machine Translation for Japanese Publication No. 2966799 B2, published Oct. 25, 1999, 11 pgs.
English Abstract and Machine Translation for Japanese Publication No. 3806312 B2, published Aug. 9, 2006, 12 pgs.
Untranslated Notification of Reasons for Refusal mailed by JPO, Jan. 26, 2016, 3 pages.
English machine translation of Notification of Reasons for Refusal mailed by JPO, Jan. 26, 2016, 4 pages.
Untranslated Decision of Refusal mailed by JPO, Apr. 12, 2016, 4 pages.
English machine translation of Decision of Refusal mailed by JPO, Apr. 12, 2016, 4 pages.
Untranslated Decision to Grant a Patent mailed by JPO, Jul. 5, 2016, 3 pages.
English machine translation of Decision to Grant a Patent mailed by JPO, Jul. 5, 2016, 3 pages.
Untranslated Notification of Reasons for Refusal mailed by JPO in Japanese Application No. 2014-254437, Jan. 26, 2016, 3 pages.
English machine translation of Notification of Reasons for Refusal mailed by JPO in Japanese Application No. 2014-254437, Jan. 26, 2016, 4 pages.
Untranslated Decision of Refusal mailed by JPO in Japanese Application No. 2014-254437, Apr. 12, 2016, 4 pages.
English machine translation of Decision of Refusal mailed by JPO in Japanese Application No. 2014-254437, Apr. 12, 2016, 4 pages.
Untranslated Decision to Grant a Patent mailed by JPO in Japanese Application No. 2014-254437, Jul. 5, 2016, 3 pages.
English machine translation of Decision to Grant a Patent mailed by JPO in Japanese Application No. 2014-254437, Jul. 5, 2016, 3 pages.

* cited by examiner

ROTARY JOINT SUPPORT STRUCTURE SPINDLE OF MACHINE TOOL, AND ELECTRIC MOTOR

BACKGROUND OF THE INVENTION

1. Field of the Invention

The present invention relates to a rotary joint support structure which performs a center-thru coolant feed operation and a spindle of a machine tool and electric motor which are provided with such a rotary joint support structure.

2. Description of the Related Art

In a machine tool, to improve the machining precision of a workpiece and extend the tool life, a coolant is run through a bore formed in a spindle etc. up to the machining point so as to cool the machining point in a "center-thru coolant" feed operation. In the spindle etc. which is carried at a machine tool in which a center-thru coolant feed operation is performed, to increase the speed of the spindle and improve the reliability, the general practice has been to use a detachable outside support type rotary joint to feed high pressure coolant.

A detachable outside support type rotary joint includes a rotating part which rotates together with the spindle etc. and a stationary part which is attached to the housing. When coolant flows through such a rotary joint, it passes between the seal part of the rotating part and the seal part of the stationary part. These seal parts can separate from each other, so the coolant sometimes leaks out from between the rotating part and the stationary part.

Therefore, in Japanese registered Patent No. 2966799, a drain hole or cutaway part for draining the coolant which leaked out from the rotary joint is formed in the support housing. Due to this, the leaked coolant is prevented from invading the inside of the spindle or electric motor. Further, Japanese Registered Patent No. 3806312 discloses to feed air to a drain hole so that leaked coolant does not remain inside the drain hole.

SUMMARY OF THE INVENTION

In this regard, when a center-thru coolant feed operation is frequently performed or when the quality of the coolant which is used is low, the coolant which leaks out from the rotary joint becomes concentrated and acts as a contaminant. Such a contaminant sometimes obstructs the operation of the rotary joint and causes a large amount of coolant to leak into the chamber.

Further, if a contaminant clogs a drain hole or cutaway part, it becomes difficult to drain the newly leaked coolant. For this reason, if a contaminant clogs a drain hole or cutaway part, the inside of the spindle or electric motor will sometimes be invaded by the coolant, poor lubrication of the spindle bearing will be caused, or poor insulation will be caused at the electric motor.

Therefore, it is necessary to periodically clean a drain hole and cutaway part of a support housing and a chamber of the rotary joint. However, at the time of cleaning, the rotary joint and the surrounding parts have to be disassembled, so the cleaning work is complicated.

The present invention was made in consideration of such a situation and has as its object the provision of a rotary joint support structure which enables easy cleaning of a chamber of a rotary joint and a drain hole and cutaway part and the provision of a spindle of a machine tool and electric motor which are provided with such a rotary joint support structure.

To achieve the above-mentioned object, according to a first aspect of the invention, there is provided a rotary joint support structure comprising a rotary joint which includes a rotating side member and a stationary side member which are provided with bores which communicate with each other, a housing which supports the stationary side member, a hollow shaft which is connected to the rotating side member, a hollow shaft surrounding part which surrounds the hollow shaft, a rotary joint holding part which is formed inside the housing and covers contact parts between the rotating side member and stationary side member, at least one drain hole which extends from an outside of the housing to the rotary joint holding part, a first cleaning passage which is formed inside the housing and is communicated with the rotary joint holding part, a hollow shaft holding part which is formed inside the housing and covers the hollow shaft and the hollow shaft surrounding part, at least one cutaway part which is formed so as to communicate an outside of the housing with the hollow shaft holding part, and a second cleaning passage which is formed inside the housing corresponding to the at least one cutaway part.

According to a second aspect of the invention, there is provided the first aspect of the invention which further comprises a flinger which is integrally attached to the hollow shaft.

According to a third aspect of the invention, there is provided the first or second aspect of the invention wherein the first cleaning passage and the second cleaning passage are communicated with each other.

According to a fourth aspect of the invention, there is provided any of the first to third aspects of the invention wherein at least one of the first cleaning passage and the second cleaning passage is provided with a stopper part which opens only at the time of cleaning.

According to a fifth aspect of the invention, there is provided any of the first to fourth aspects of the invention wherein at least one of the first cleaning passage and the second cleaning passage has a cleaning use fluid source connected to it.

According to a sixth aspect of the invention, there is provided the fifth aspect of the invention further comprising a control device which controls at least one of a flow rate, pressure, feed timing, and feed time of a fluid which is fed from the cleaning use fluid source to at least one of the first cleaning passage and the second cleaning passage.

According to a seventh aspect of the invention, there is provided a spindle of a machine tool which comprises a rotary joint support structure according to any one of the first to sixth aspects of the invention.

According to an eighth aspect of the invention, there is provided an electric motor which comprises a rotary joint support structure according to any one of the first to sixth aspects of the invention.

In the first, seventh, and eighth aspects of the invention, by feeding fluid to the first cleaning passage and the second cleaning passage, the fluid makes the coolant which had leaked out into the rotary joint holding part and hollow shaft holding part flow out to a drain hole and cutaway part. In other words, the first cleaning passage and the second cleaning passage can be used to easily clean a holding part, drain hole, and cutaway part, so coolant or contaminant can be kept from causing the holding part, drain hole, and cutaway part to be closed. Further, since there is no need to disassemble the rotary joint support structure, a holding part, drain hole, and cutaway part can be easily cleaned. Furthermore, in the seventh and eighth aspects of the invention, the spindle and electric motor can be improved in reliability.

In the second aspect of the invention, the flinger is spun so that the coolant and contaminant are flung off, so a holding part, drain hole, and cutaway part can be cleaned more efficiently.

In the third aspect of the invention, if feeding cleaning fluid to only one of the first cleaning passage and the second cleaning passage, the cleaning fluid can also be fed to the other.

In the fourth aspect of the invention, it is possible to eliminate the need for detaching the stopper part when feeding cleaning fluid to at least one of the first cleaning passage and the second cleaning passage.

In the fifth aspect of the invention, it is possible to feed cleaning fluid by a desired pressure to at least one of the first cleaning passage and the second cleaning passage, so coolant or contaminant can be reliably drained from the rotary joint.

In the sixth aspect of the invention, a holding part, drain hole, and cutaway part can be cleaned periodically and automatically.

These objects, features, and advantages and other objects, features, and advantages of the present invention will be understood more clearly from the detailed description of typical embodiments shown in the attached drawings.

DETAILED DESCRIPTION

Below, embodiments of the present invention will be explained with reference to the attached drawings. In the following drawings, similar members are assigned similar reference notations. To facilitate understanding, these figures are suitably change in scale.

Figure 1:
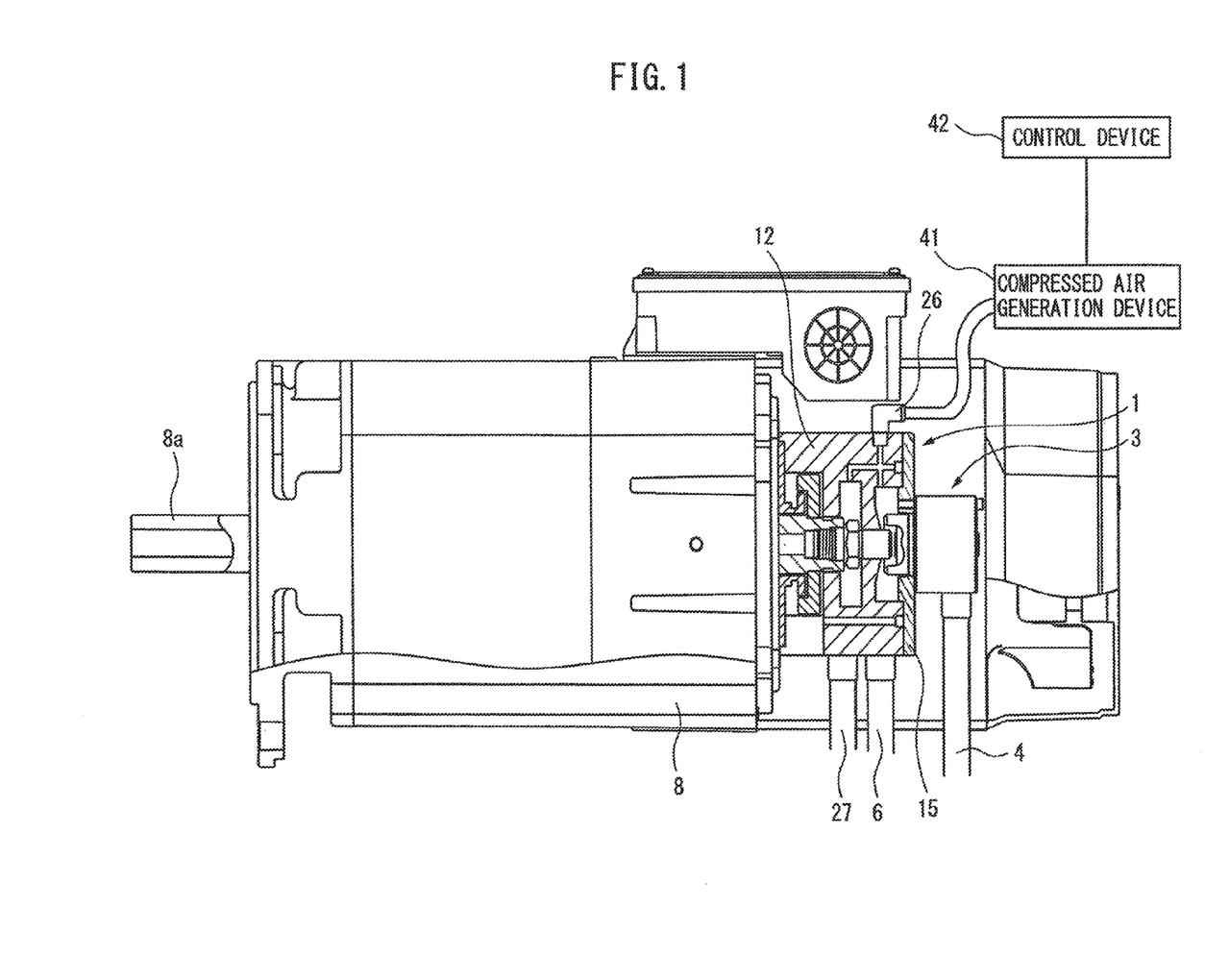
FIG. 1 is a side cross-sectional view of a motor which is provided with a rotary joint support structure according to the present invention.

FIG. 1 is a side cross-sectional view of a motor which is provided with a rotary joint support structure according to the present invention. As shown in FIG. 1, a rotary joint support structure 1 is arranged coaxially with an output shaft 8a at an end part of a motor 8 at an opposite side from a hollow output shaft 8a. The rotary joint support structure 1 includes a rotary joint 3. At the circumferential surface of its housing 12, an air purge pipe 26 is connected. Further, as explained later, the motor is made one which is used for driving a spindle of a machine tool.

As shown in FIG. 1, the air purge pipe 26 is connected to a cleaning fluid source, for example, a compressed air generation device 41. The compressed air generation device 41 generates compressed air by the desired pressure and feeds it to the air purge pipe 26. Note that, a fluid source which feeds cleaning fluid other than compressed air may also be used. Further, the compressed air generation device 41 is connected to a control device 42 which controls the compressed air generation device 41.

Figure 2:
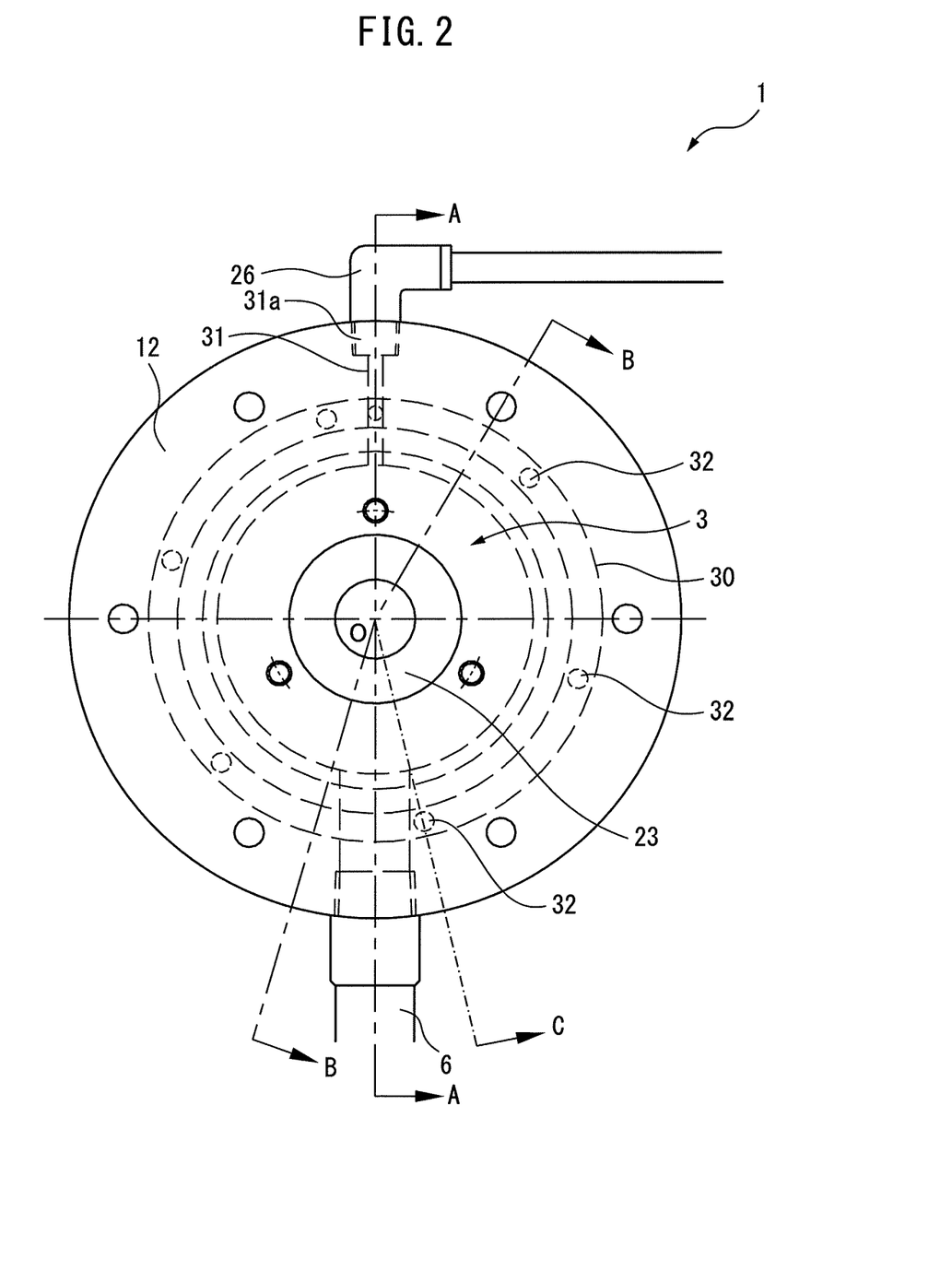
FIG. 2 is a top view of a rotary joint support structure according to the present invention.

FIG. 2 is a top view of a rotary joint support structure according to the present invention. As shown in FIG. 2, the housing 12 of the rotary joint 3 is cylindrical in shape. Further, on the center axis O of the housing 12, a stationary side member 23 of the rotary joint 3 is arranged. Further, a drain pipe 6 is provided at the circumferential surface of the housing 12 at the opposite side to the air purge pipe 26.

Figure 3:
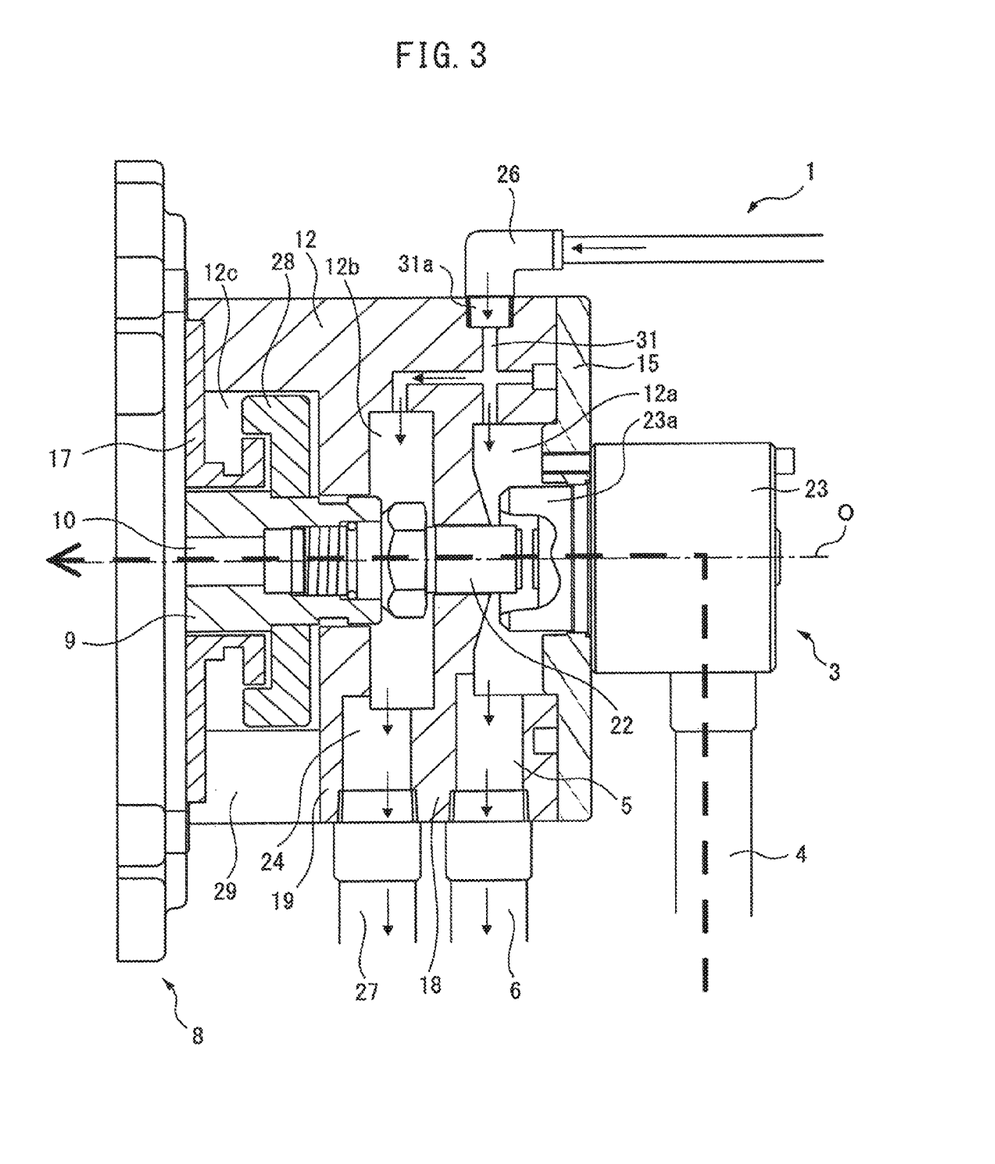
FIG. 3 is a cross-sectional view seen along the line A-A of FIG. 2.

FIG. 3 is a cross-sectional view seen along the line A-A of FIG. 2. At an end part of the motor 8, a hollow shaft 9 which is provided with a bore 10 and a hollow shaft surrounding part 17 which surrounds the hollow shaft 9 are set. These hollow shaft 9 and hollow shaft surrounding part 17 are considered to be included in the rotary joint support structure 1.

Figure 4:
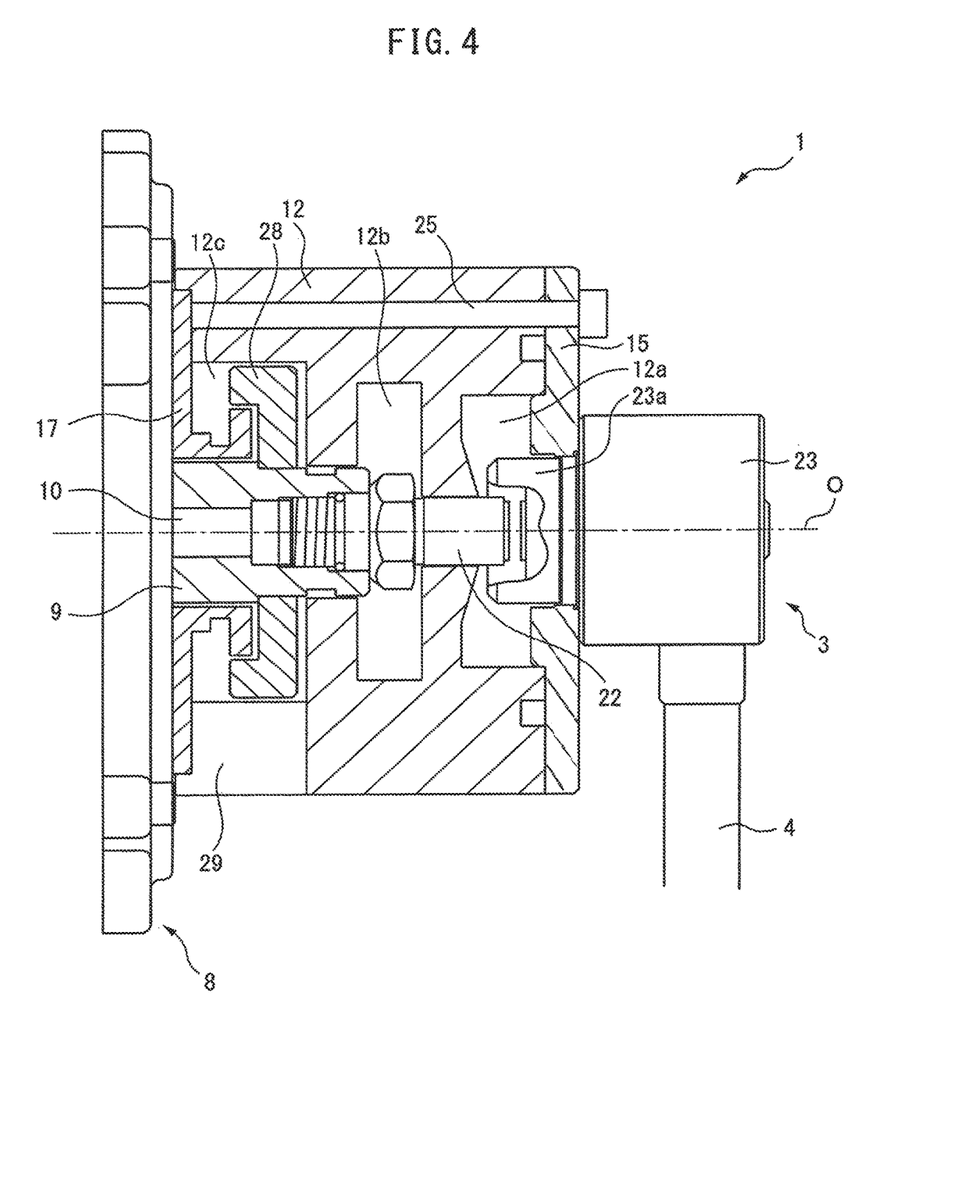
FIG. 4 is a cross-sectional view seen along the line B-B of FIG. 2.

FIG. 4 is a cross-sectional view seen along the line B-B of FIG. 2. As shown in FIG. 3 and FIG. 4, the base end of the housing 12 is closed by a lid part 15. Further, as will be understood from FIG. 4, the lid part 15 is fixed to the housing 12 by a bolt 25.

Referring again to FIG. 3, the inside of the housing 1 is divided into three chambers 12a, 12b, and 12c in the center axis O direction by the partitions 18, 19. Further, a drain hole 5 is formed which extends from the circumferential surface of the housing 12 to the chamber 12a. The drain hole 5 has a drain pipe 6 connected to it. Similarly, a spare drain hole 24 is formed which extends from the circumferential surface of the housing 12 to the chamber 12b. The spare drain hole 24 has a spare drain pipe 27 connected to it.

In this regard, the rotary joint 3 includes a nipple shaped rotating side member 22 and a stationary side member 23 which is integrally attached to the housing 12. These rotating side member 22 and stationary side member 23 are formed with bores which extend in the axial direction. Further, the rotating side member 22 and stationary side member 23 are arranged so that their bores communicate with each other.

As illustrated, at the chamber 12a, a socket part 23a of the stationary side member 23 and a base end part of the rotating side member 22 which contacts the socket part 23a are arranged. The socket part 23a is inserted from the outside of the housing 12 to the inside of the chamber 12a where it is fastened to the housing 12. Further, at the chamber 12b, part of the rotating side member 22 is arranged. Therefore, the chambers 12a, 12b may be referred to together as a "rotary joint holding part". Further, in a not shown embodiment, the partition 18 may be eliminated and the chamber 12b omitted.

Further, at the chamber 12c, a hollow shaft 9 and a hollow shaft surrounding part 17 are arranged. For this reason, the chamber 12c may also be called a "hollow shaft holding part". Further, the front end part of the rotating side member 22 of the rotary joint 3 is fastened by being screwed into a taper thread which is cut into the end part of the bore 10 of the hollow shaft 9. Furthermore, the flinger 28 is integrally attached to the hollow shaft 9. If the rotating side member 22 rotates, the hollow shaft 9 and the flinger 28 also integrally rotate. Further, due to the centrifugal force of the rotation, the coolant or contaminant is flung to the outside in the radial direction at the inside of the chamber 12c. Therefore, the flinger 28 assists the cleaning of the chamber 12c and the later explained cutaway parts 29.

At the time of operation, coolant is fed at a high pressure from the pipe 4 which is connected to the stationary side member 23. The coolant runs through the bore of the stationary side member 23, the socket part 23a, and the bore of the rotating side member 22 to flow into the bore 10 of the hollow shaft 9. Then, it passes through the hollow output shaft 8a of the motor 8 (see FIG. 1).

Figure 8A:
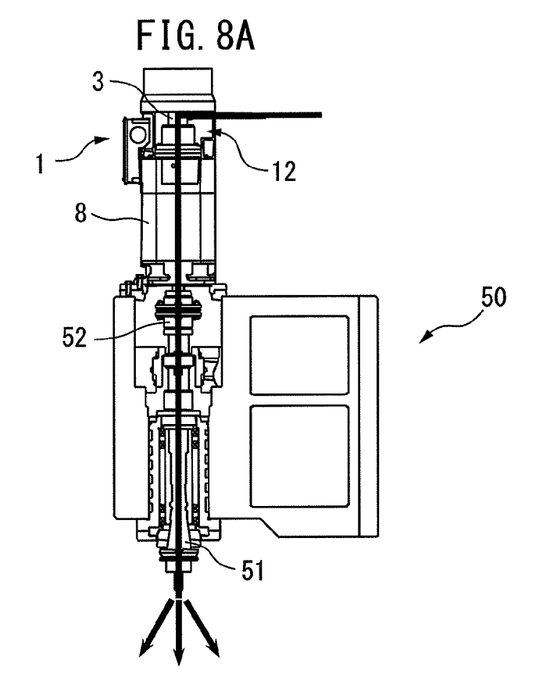
FIG. 8A is a side view of a machine tool which is provided with a motor which is shown in FIG. 1.

In this regard, FIG. 8A is a side view of a machine tool which is provided with the motor which is shown in FIG. 1. In FIG. 8A, the hollow spindle 51 of the machine tool 50 is directly connected to the output shaft 8a of the motor 8 by the coupling 52. Therefore, the spindle 51 and the output shaft 8a of the motor 8 are coaxial with each other. As shown in FIG. 8A by the arrow mark, the coolant which passes through the output shaft 8a of the motor 8 passes through the bore inside the spindle 51 and is discharged from the front end of the spindle 51. Due to this, the coolant can reach the machining point and a center-thru coolant feed operation can be performed.

In this regard, referring again to FIG. 3, the socket part 23a and the rotating side member 22 are slidably in contact with each other. For this reason, when using the rotary joint 3 to perform a center-thru coolant feed operation on a frequent basis or when the quality of the coolant which is used is low, coolant sometimes leaks out from between the socket part 23a of the stationary side member 23 and the rotating side member 22. Further, the leaked coolant runs from the chamber 12a through the drain pipe 6 to be drained to the outside. Further, the coolant which invades the inside of the chamber 12b is drained from the spare drain pipe 27. The leaked coolant is concentrated inside the chamber 12a and chamber 12b and becomes a contaminant.

Furthermore, the coolant which reaches the chamber 12c is flung outward in the radial direction together with foreign matter etc. by the flinger 28 which is integrally attached to the hollow shaft 9. Further, the flung coolant etc. is discharged to the outside from a plurality of cutaway parts 29 which are provided at the outer circumferential surface at the bottom end part of the housing 12.

As shown in FIG. 3, the air purge pipe 26 is connected to the first cleaning passage 31 which is formed inside the housing 12. As will be understood from FIG. 3, the first cleaning passage 31 extends from the circumferential surface of the housing 12 to the chamber 12a. Furthermore, the first cleaning passage 31 branches in the middle and is also connected to the inside of the chamber 12b.

In the present invention, if the compressed air generation device 41 feeds cleaning fluid, for example, compressed air, to the air purge pipe 26, the compressed air runs through the first cleaning passage 31 and chamber 12a and is drained from the drain pipe 6. Similarly, compressed air runs through the first cleaning passage 31 and chamber 12b and is drained from the spare drain pipe 27. For this reason, the coolant in the chamber 12a and chamber 12b can be drained through the drain holes 5, 24 from the drain pipe 6 and spare drain pipe 27. Further, it is possible to adjust the compressed air generation device 41 to feed compressed air by the desired pressure, so it will be understood that the coolant can be reliably drained.

In this way, in the present invention, by using compressed air, the coolant or contaminant which leaks out is prevented from clogging the chambers 12a, 12b and drain holes 5, 24. Further, when using compressed air for cleaning in this way, there is no need to disassemble the rotary joint 3. Therefore, it will be understood that the chambers 12a, 12b and drain holes 5, 24 can be easily cleaned. Furthermore, in the present invention, the motor 8 which is provided with the rotary joint support structure 1 can be raised in reliability as a result.

Figure 5:
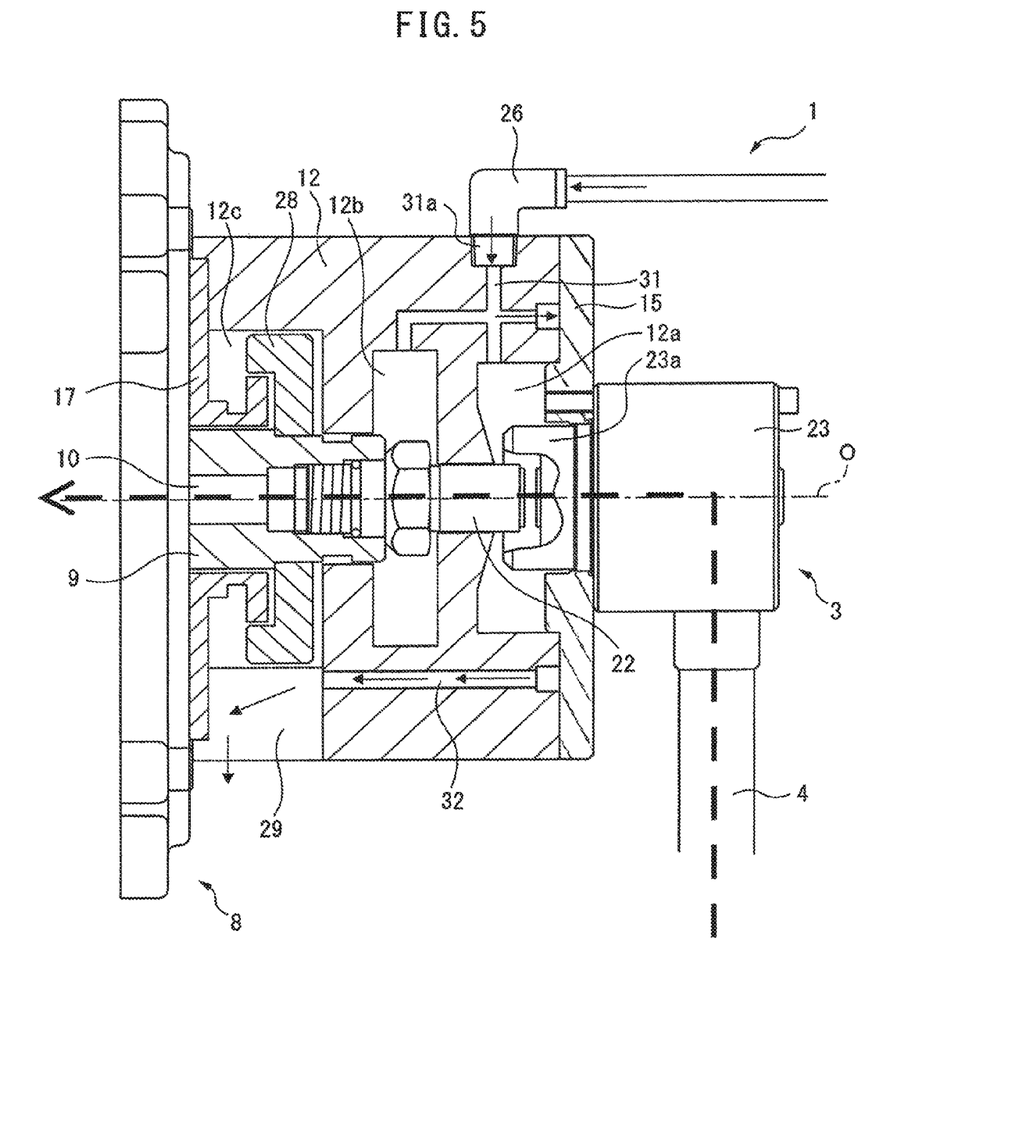
FIG. 5 is a cross-sectional view seen along the line A-C of FIG. 2.
Figure 6:
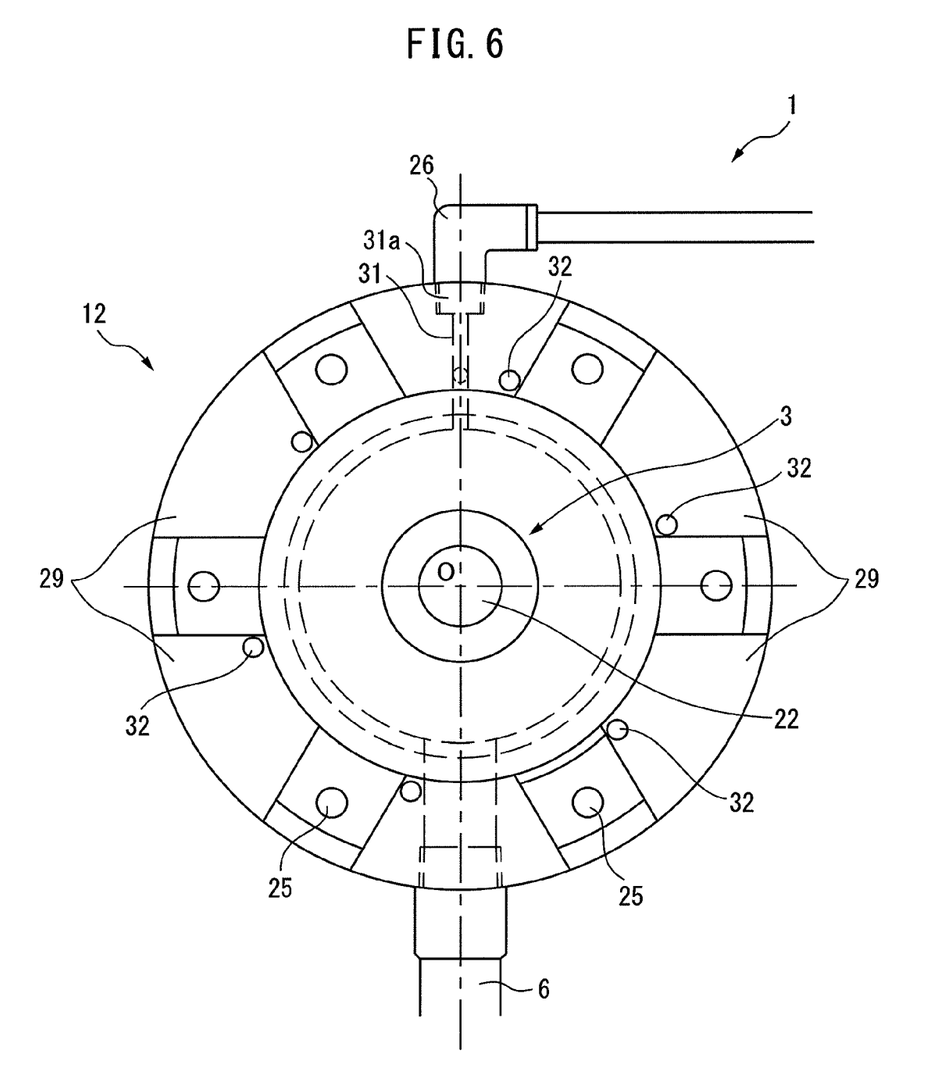
FIG. 6 is a back view of a rotary joint support structure according to the present invention.

In this regard, FIG. 5 is a cross-sectional view seen along the line A-C of FIG. 2. As shown in FIG. 5, a second cleaning passage 32 which extends from the lid part 15 toward a cutaway part 29 is formed in the housing 12. Further, FIG. 6 is a back view of the rotary joint support structure according to the present invention. As will be understood by comparing FIG. 2, FIG. 5, and FIG. 6, a plurality of second cleaning passages 32 are formed at equal intervals in the circumferential direction of the housing 12. These plurality of the second cleaning passages 32 are formed at positions corresponding to the plurality of cutaway parts 29 of the housing 12.

Further, as will be understood referring to FIG. 2, at the inside of the lid part 15, a ring-shaped passage 30 is formed. The ring-shaped passage 30 is communicated with the plurality of second cleaning passages 32. Further, as shown in FIG. 3 and FIG. 5, the first cleaning passage 31 of the housing 12 is communicated with the ring-shaped passage 30 of the lid part 15.

Being configured in this way, if the compressed air generation device 41 feeds cleaning fluid, for example, compressed air, to the air purge pipe 26, the compressed air runs from the first cleaning passage 31 through the ring-shaped passage 30 of the lid part 15 and reaches the plurality of the second cleaning passages 32. Then, the compressed air is discharged from the cutaway parts 29 corresponding to the second cleaning passages 32. For this reason, the coolant inside the chamber 12c can be drained from the plurality of cutaway parts 29. Therefore, in the same way as explained above, it will be understood that the leaked coolant or contaminant is prevented from clogging the chamber 12c and cutaway parts 29 and that the chamber 12c and cutaway parts 29 can be more easily cleaned.

Further, in the present invention, the first cleaning passage 31 and the second cleaning passages 32 are communicated with each other through the ring-shaped passage 30. Therefore, if feeding cleaning fluid to only the first cleaning passage 31, the second cleaning passages 32 can also be fed cleaning fluid. For this reason, there is no need to prepare an air purge pipe especially for the second cleaning passages 32.

Figure 7:
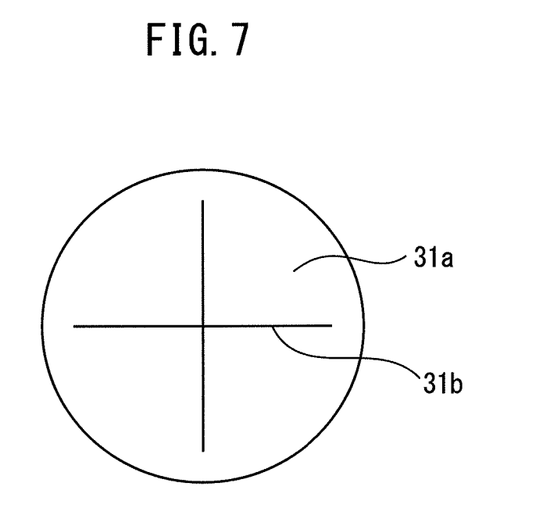
FIG. 7 is an enlarged end face view of a stopper part.

In this regard, if referring to FIG. 3 etc., a stopper part 31a is fit inside the inlet of the first cleaning passage 31 at the circumferential surface of the housing 12. The stopper part 31a is formed from an elastomer, for example, rubber. As shown in the partially enlarged end view of the stopper part of FIG. 7, one end of the stopper part 31a is formed with a slit 31b, for example, an X-shaped slit 31b. This slit 31b is made one which extends to the other end of the stopper part 31a in the direction of flow of the cleaning fluid.

In FIG. 3 etc., the front end of the air purge pipe 26 is made to be inserted into the slit 31b of such a stopper part 31a. Further, if the air purge pipe 26 is detached, the slit 31b of the stopper part 31a automatically closes. In other words, the stopper part 31a is opened only when inserting the front end of the air purge pipe 26, and the stopper part 31a closes when detaching the air purge pipe 26.

Since such a stopper part 31a is used, in the present invention, there is no need to detach the stopper part 31a when connecting the air purge pipe 26 to the first cleaning passage 31. Therefore, it is possible to connect the air purge pipe 26 to the first cleaning passage 31 in a short time.

Further, when a need arises to clean the chambers 12a to 12c, drain holes 5, 24, and cutaway parts 29, the air purge pipe 26 is manually attached to the stopper part 31a. Further, by feeding compressed air of the desired pressure to the air purge pipe 26, it is possible to perform the above-mentioned cleaning work.

In this regard, the control device 42 which is shown in FIG. 1 is made one which is able to control at least one of the flow rate, pressure, feed timing, and feed time of compressed air which is generated by the compressed air generation device 41. In this case, it is preferable to leave the air purge pipe 26 connected to the first cleaning passage 31. Therefore, by controlling the control device 42, it becomes possible to periodically automatically clean the chambers 12a to 12c, drain holes 5, 24, and cutaway parts 29.

Alternatively, the control device 42 may also serve as the control device of the machine tool. In this case, performing the cleaning work before the spindle performs machining is entered into the program of the machine tool. Due to this, it is possible to keep the amount of compressed air which is required to a minimum while cleaning the chambers 12a to 12c etc. well.

Figure 8B:
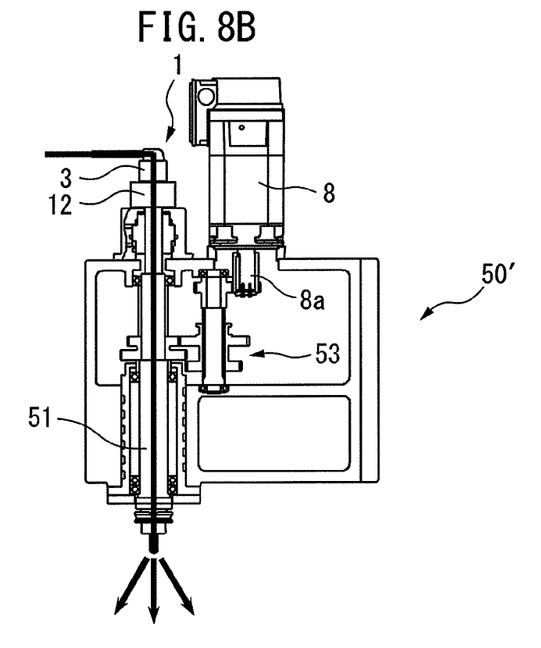
FIG. 8B is a side view of another machine tool.

In this regard, FIG. 8B is a side view of another machine tool. In the other machine tool 50', the output shaft 8a of the motor 8 and the spindle 51 are not coaxial. In FIG. 8B, the output shaft 8a of the motor 8 and the spindle 51 are connected by a speed reducer 53 which includes a plurality of gears. Further, the rotary joint support structure 1 of the present invention is arranged at the base end of the spindle 51. In this case, the hollow shaft 9, hollow shaft surrounding part 17, etc. are made ones which are provided at the base end of the spindle 51.

In the machine tool which is shown in FIG. 8B, if coolant is fed by a high pressure from a pipe 4 which is connected to the stationary side member 23 of the rotary joint support structure 1, the coolant will flow through the bore of the stationary side member 23, the socket part 23a, and the bore of the rotating side member 22 and flow into the bore 10 of the hollow shaft 9. Further, as shown by the arrow mark in FIG. 8B, the coolant runs from the base end of the spindle 51 through the bore of the spindle 51 and is discharged from the front end of the spindle 51 whereby a center-thru coolant feed operation is performed. It will be clear that with such a configuration as well, effects similar to those explained above are obtained.

Note that, in a not shown embodiment, a second cleaning passage 32 extends from the circumferential surface of the housing 12 and the second cleaning passage 32 is provided with a dedicated air purge pipe. Further, a stopper part similar to the stopper part 31a may be provided at the second cleaning passage 32 as well. It will be understood that such a case as well is included in the scope of the present invention.

ADVANTAGEOUS EFFECTS OF INVENTION

In the first, seventh, and eighth aspects of the invention, by feeding fluid to the first cleaning passage and the second cleaning passage, the fluid makes the coolant which had leaked out into the rotary joint holding part and hollow shaft holding part flow out to a drain hole and cutaway part. In other words, the first cleaning passage and the second cleaning passage can be used to easily clean a holding part, drain hole, and cutaway part, so coolant or contaminant can be kept from causing the holding part, drain hole, and cutaway part to be closed. Further, since there is no need to disassemble the rotary joint support structure, a holding part, drain hole, and cutaway part can be easily cleaned. Furthermore, in the seventh and eighth aspects of the invention, the spindle and electric motor can be improved in reliability.

In the second aspect of the invention, the flinger is spun so that the coolant and contaminant are flung off, so a holding part, drain hole, and cutaway part can be cleaned more efficiently.

In the third aspect of the invention, if feeding cleaning fluid to only one of the first cleaning passage and the second cleaning passage, the cleaning fluid can also be fed to the other.

In the fourth aspect of the invention, it is possible to eliminate the need for detaching the stopper part when feeding cleaning fluid to at least one of the first cleaning passage and the second cleaning passage.

In the fifth aspect of the invention, it is possible to feed cleaning fluid by a desired pressure to at least one of the first cleaning passage and the second cleaning passage, so coolant or contaminant can be reliably drained from the rotary joint.

In the sixth aspect of the invention, a holding part, drain hole, and cutaway part can be cleaned periodically and automatically.

Typical embodiments were used to explain the present invention, but a person skilled in the art would understand that the above-mentioned changes and various other changes, deletions, and additions may be made without departing from the scope of the present invention.

What is claimed is:

1. A rotary joint support structure, comprising:
a rotary joint which includes a rotating side member and a stationary side member which are provided with bores which communicate with each other,
a housing which supports said stationary side member,
a hollow shaft which is connected to said rotating side member,
a hollow shaft surrounding part which surrounds said hollow shaft,
a hollow rotary joint holding part which is formed inside said housing and surrounds contact parts between said rotating side member and stationary side member,
at least one drain hole which extends from an outside of said housing to said rotary joint holding part,
a first cleaning passage which is formed inside said housing and is in fluid communication with said rotary joint holding part,
a hollow shaft holding part which is formed inside said housing and covers said hollow shaft and said hollow shaft surrounding part,
a plurality of cutaway parts which are formed in a circumferential direction of the housing so as to communicate an outside of said housing with said hollow shaft holding part, and
a plurality of second cleaning passages, each of which is in fluid communication with each of the cutaway parts inside said housing at positions corresponding to the plurality of cutaway parts.

2. A rotary joint support structure according to claim 1 which further comprises a flinger which is integrally attached to said hollow shaft.

3. A rotary joint support structure according to claim 1, wherein said first cleaning passage and said second cleaning passage are in fluid communication with each other.

4. A rotary joint support structure according to claim 1, wherein at least one of said first cleaning passage and said second cleaning passage is provided with a stopper part which opens only at the time of cleaning.

5. A rotary joint support structure according to claim 1, wherein at least one of said first cleaning passage and said second cleaning passage has a cleaning fluid source connected to it.

6. A rotary joint support structure according to claim 5 further comprising a control device which controls at least one of a flow rate, pressure, feed timing, and feed time of a fluid which is fed from said cleaning fluid source to at least one of said first cleaning passage and said second cleaning passage.

7. A spindle of a machine tool which comprises a rotary joint support structure according to claim 1.

8. An electric motor which comprises a rotary joint support structure according to claim 1.

9. A rotary joint support structure according to claim 1, wherein
- a ring-shaped passage is formed at a lid part which closes an end of the housing,
- wherein the plurality of second cleaning passages extend from the ring-shaped passage to the plurality of cut-away parts in an axial direction of the hollow shaft, and
- wherein the ring-shaped passage is in fluid communication with the first cleaning passage and the plurality of the second cleaning passages.

* * * * *